No. 865,075. PATENTED SEPT. 3, 1907.
R. BRAUN.
BELT HOLDER.
APPLICATION FILED MAY 23, 1907.

2 SHEETS—SHEET 2.

Inventor
Reiner Braun

Witnesses
W. S. Rockwell
M. J. Miller.

By
Attorneys

UNITED STATES PATENT OFFICE.

REINER BRAUN, OF GLEN ULLIN, NORTH DAKOTA.

BELT-HOLDER.

No. 865,075.   Specification of Letters Patent.   Patented Sept. 3, 1907.

Application filed May 23, 1907. Serial No. 375,350.

*To all whom it may concern:*

Be it known that I, REINER BRAUN, a citizen of the United States, residing at Glen Ullin, in the county of Morton, State of North Dakota, have invented certain new and useful Improvements in Belt-Holders; and I do hereby declare the following to be a full, clear, and exact description of the invention, such as will enable others skilled in the art to which it appertains to make and use the same.

This invention relates to new and useful improvements in belt holders for threshing machines and other apparatuses of like character, in which the belt is frequently displaced from its pulleys by vibration, wind pressure, and other causes.

In connection with a machine of the above type, the invention aims as a primary object to provide a belt holder embodying adjustably connected sections capable of adjustment to accommodate belts of varying widths therebetween.

The invention aims as a further object to provide a belt holder embodying a novel combination, construction, and arrangement of parts, the details of which will appear in the course of the following description, in which reference is had to the accompanying drawings forming a part of this specification, like characters of reference designating similar parts throughout the several views, wherein:—

Figure 1:
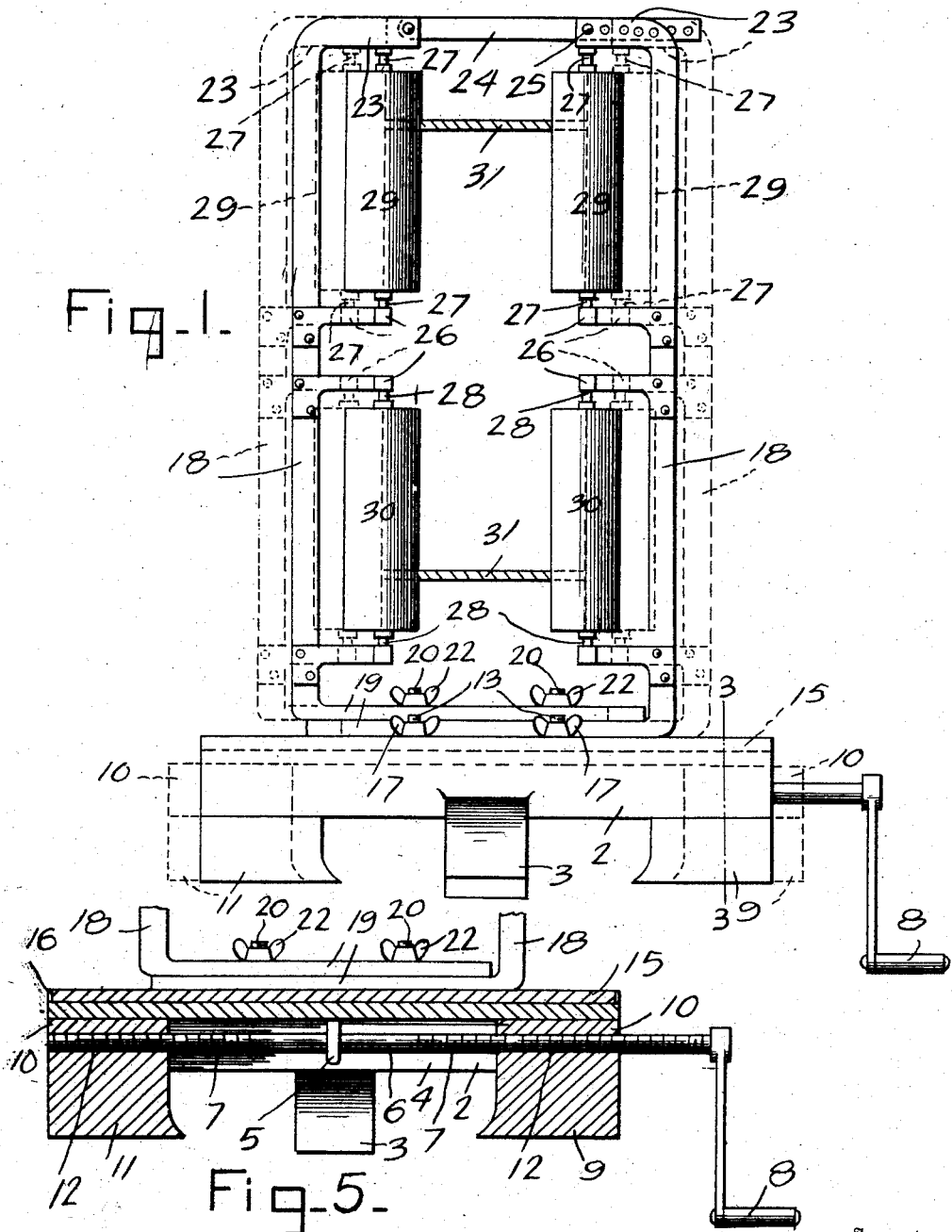
Figure 2:
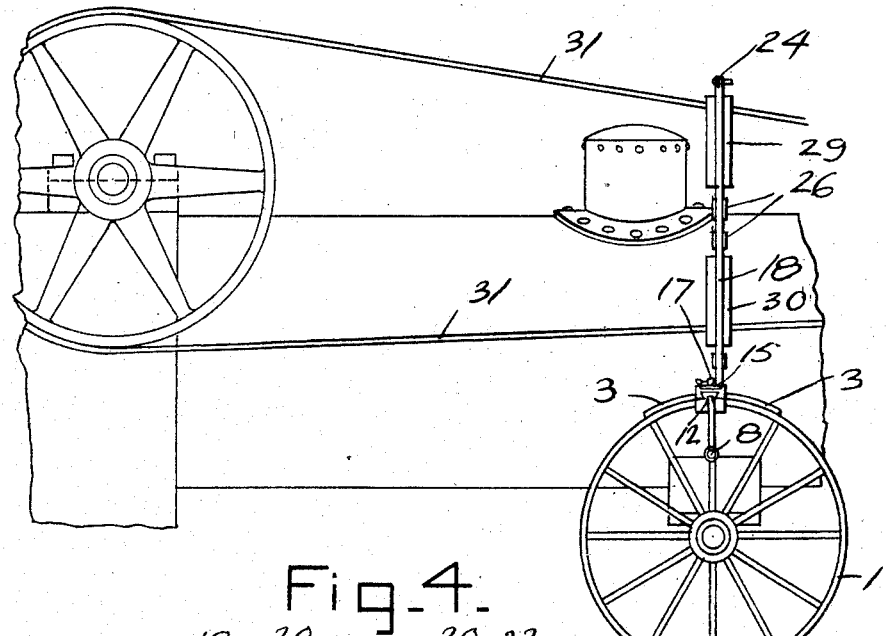
Figure 4:
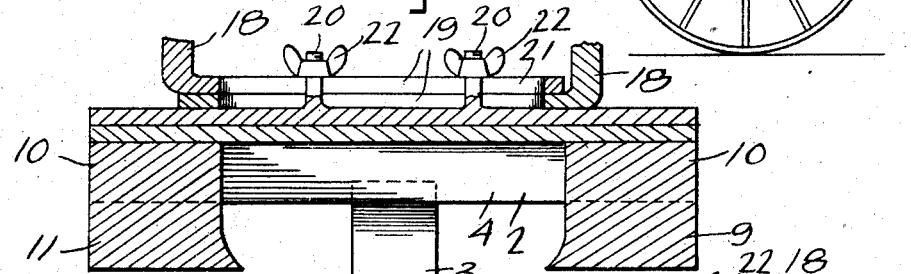
Figures 3, 6:
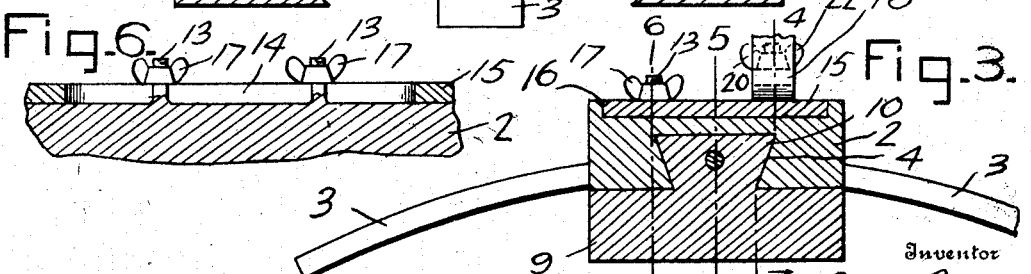

Figure 1 is a front elevation of a belt holder constructed in accordance with the present invention, the movement of the displaceable part being indicated by dotted lines. Fig. 2 is a side elevation thereof, showing the same applied to a traction engine of conventional form. Fig. 3 is a transverse section on the line 3—3 of Fig. 1. Fig. 4 is a longitudinal section on the line 4—4 of Fig. 3. Fig. 5 is a longitudinal section on the line 5—5 of Fig. 3. Fig. 6 is a longitudinal section on the line 6—6 of Fig. 3.

Referring specifically to the accompanying drawings, the numeral 1 designates one of the traction wheels of a threshing machine upon which the belt holder embodied in the present invention is mounted during the action of such machine. Such belt holder comprises a base-block 2, provided at its sides with curved lugs 3 for centering the same upon the wheel 1, and having in its underneath face a longitudinal dove-tail groove 4. Centrally of said groove the block 2 is provided with a depending apertured lug 5, in which is journaled the unthreaded portion 6 of a screw-shaft oppositely threaded, as at 7, on each side of its unthreaded portion and terminating in a crank handle 8, which projects beyond the end of a clamping block 9, the latter being formed upon its upper face with a dove-tail rib 10, interfitting in the groove 4. A similarly constructed clamping block 11 is mounted in like manner at the other end of the base-block 2, and the clamping blocks 9 and 11 are provided with threaded bores 12, extending axially therethrough, and which surround the threaded portions 7 of the screw-shaft, and mesh with the threads thereof. The block 2 is provided with vertical threaded posts 13, which project through a longitudinal slot 14 provided in a slidable member 15, the latter being imposed on the block 2 and seated in a groove 16 provided in the upper face thereof. Wing-nuts 17 are threaded upon the posts 13 for frictionally engaging the surface of block 15 and holding the latter at any position to which it may be slidably adjusted, such adjustment being manual.

The belt holder proper is supported upon the block 15 and comprises vertical standards 18, terminating at their lower ends in horizontal arms 19, one of which is imposed upon the other. The sliding block 15 is provided with vertical threaded posts 20, which project through longitudinal slots 21, provided in both of the arms 19. Wing-nuts 22 are threaded upon the posts 20, and frictionally engage the surface of the uppermost arm 19 for holding the standards 18 at any selected position to which they may be set with relation to one another. The standards 18, at their upper ends, are provided with short-length horizontal arms 23, having their ends spaced away from one another. One of the arms 23 carries a hinged member 24 designed for movement to bridge said arms and close the space therebetween, and having its free end constructed for engagement with a catch 25 provided on the other arm. The standards 18 are provided with inwardly-projecting spaced bracket bearings 26, and the arms 23 are constructed with bearings, in which function they aline with the bearings 26. The extreme pairs of bearings 26 conjointly receive trunnions 27 and 28 of respective upper and lower pulleys 29 and 30, vertically disposed and arranged opposite one another in spaced parallel relation. The upper portion of a belt 31 passes between the pulleys 29, and the lower portion of said belt, which, of course, moves in an opposite direction from the upper portion, passes between the pulleys 30. The belt 31 is employed to drive the operative part from the engine of the machine, and is held against displacement by reason of the causes previously noted from the driving and driven pulleys, laterally, by means of the pulleys 29 and 30, and vertically by means of the lower part of the belt holder and of the member 24. It will be apparent that the standards 18 may be adjusted to selected positions towards or away from one another by means of the screws 22, posts 20, and slot 21. In like manner the block 15 may be adjustably positioned longitudinally of the block 2. By rotating the crank arm 8, the screw-shaft will feed the blocks 9 and 11 simultaneously towards or away from one another in accordance with the width of the traction wheel upon which the device is supported.

A belt holder constructed in accordance with the present invention is simple in construction, comparatively inexpensive to manufacture, and practical and efficient in use.

From the foregoing description, it will be seen that simple and efficient means are provided for accomplishing the objects of the invention, but, while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is—

A belt holder of the type set forth, comprising standards, alined bearings provided thereon, pulleys having their trunnions journaled in said bearings, means for mounting said standards on a stationary object, the upper ends of said standards being spaced away, and a displaceable bridge member carried at the upper end of one of said standards and designed for detachable engagement with the upper end of the other of said standards.

In testimony whereof, I affix my signature, in presence of two witnesses.

REINER BRAUN.

Witnesses:
F. A. TAVIS,
CHARLES HORST.